April 5, 1932. G. H. HANA 1,852,967
PHOTOGRAPHIC APPARATUS
Filed Sept. 7, 1929  3 Sheets-Sheet 3
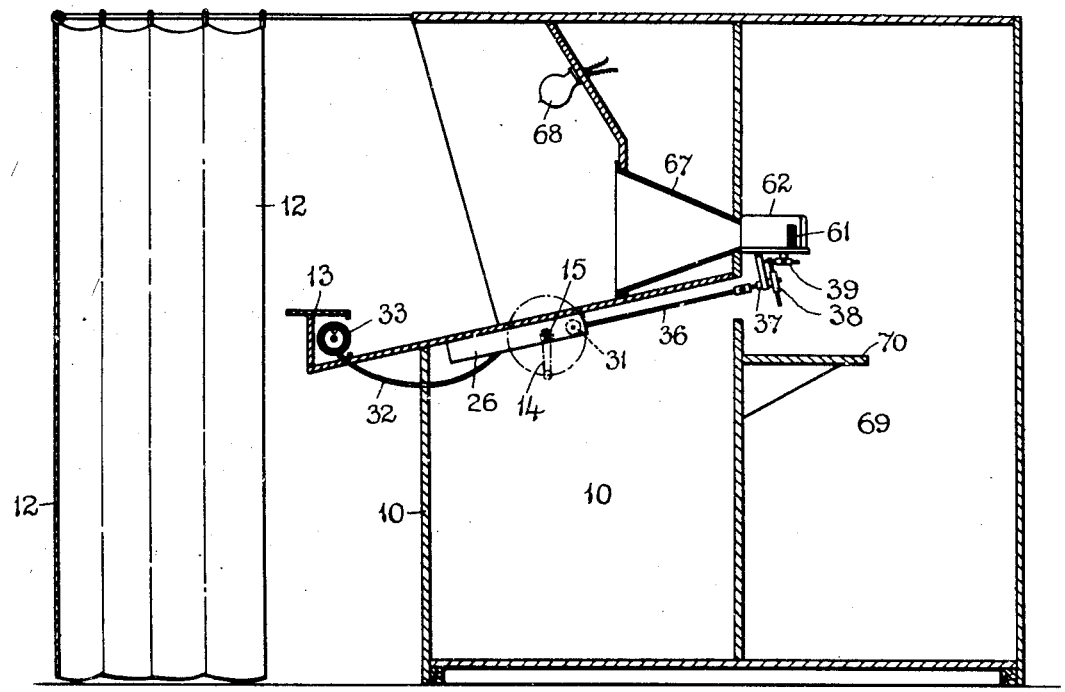
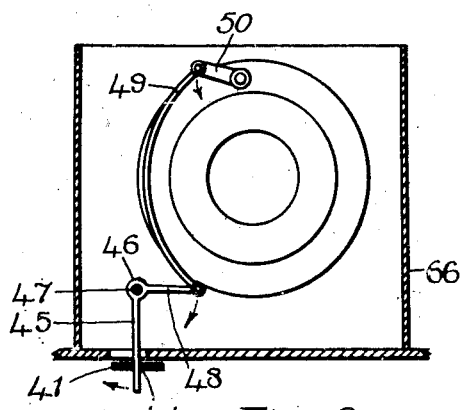
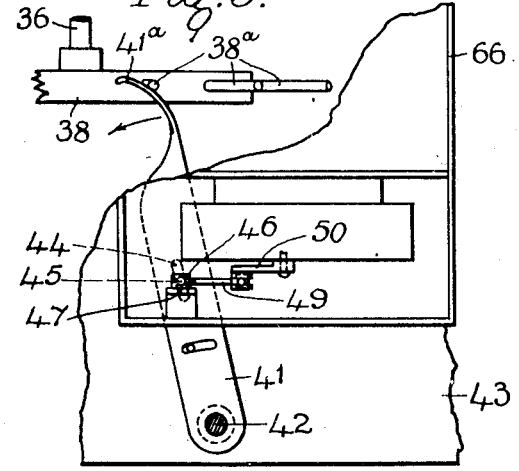
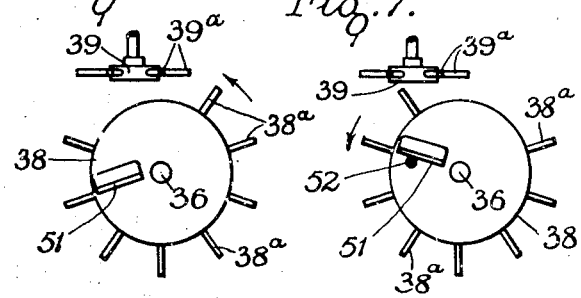
INVENTOR
George H. Hana,
BY
ATTORNEY Patented Apr. 5, 1932

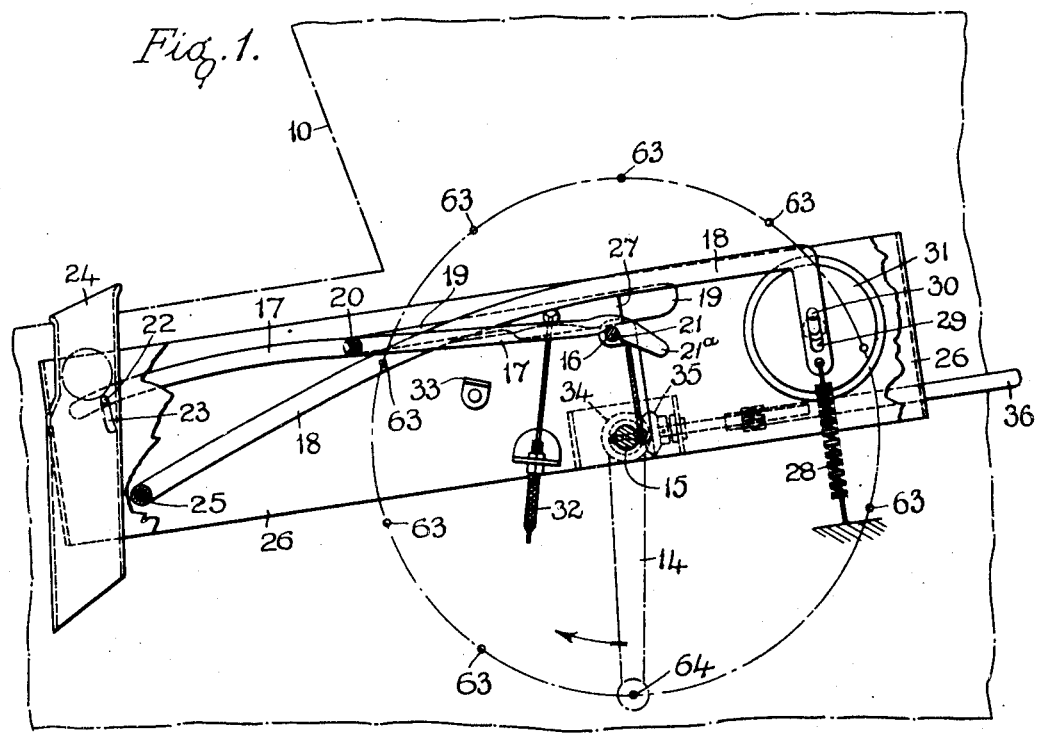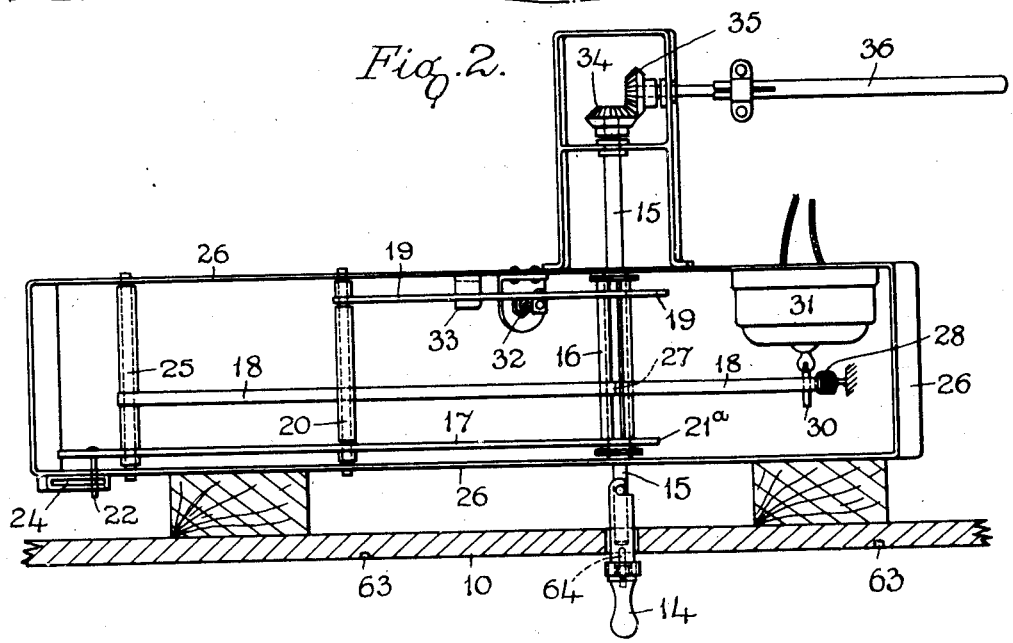

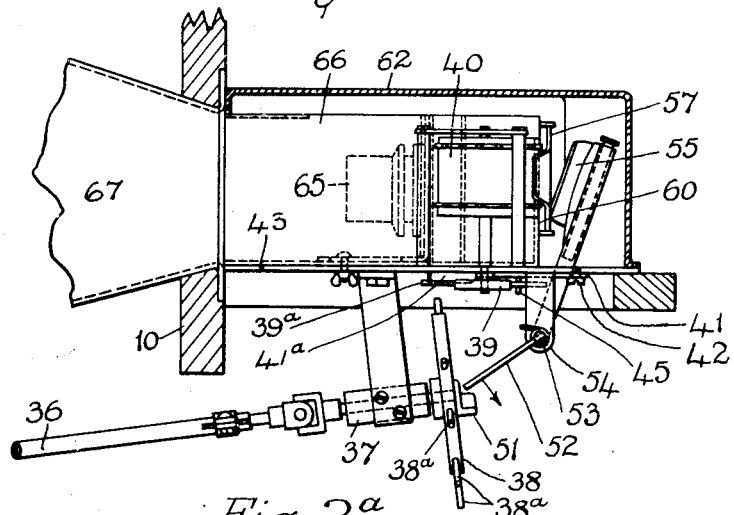
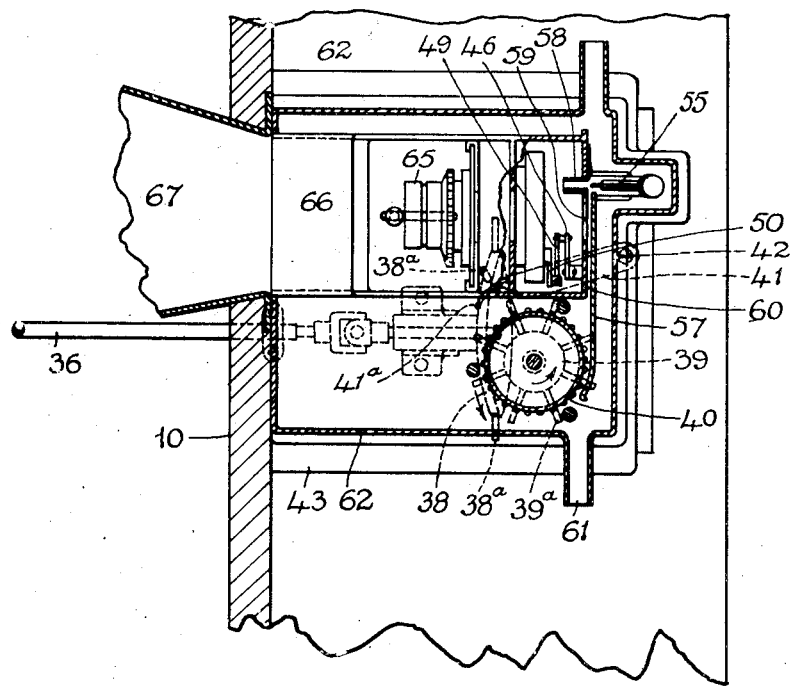

1,852,967

UNITED STATES PATENT OFFICE

GEORGE HENRY HANA, OF LONDON, ENGLAND

PHOTOGRAPHIC APPARATUS

Application filed September 7, 1929, Serial No. 391,031, and in Great Britain September 22, 1928.

The object of this invention is to provide an apparatus by means of which portions of sensitive materials can be exposed in rapid succession for the production of negatives or prints.

Since no skill or special knowledge is necessary to operate the apparatus, this may be done by hand, or by motive power such as from a small electric motor, a spring motor or the like, means being provided to release the apparatus for action and lock same at the end of its movement.

The locking means or lever employed may be coin-controlled and after the mechanism has been released the simple turning of a handle or equivalent part produces a number of separate exposures of the sensitive material, after which the mechanism will be locked.

A number of different views of a person or object placed within the field of view and within focus of the lens can thus be photographed very rapidly as a result of the invention.

The apparatus may be arranged in a box or cabinet, or housed in any suitable way convenient for the kind of work intended to be done.

My invention will be clearly understood from the following description aided by the annexed drawings which illustrate an apparatus arranged for portraiture.

Figure 1 is a side sectional elevation of the coin freed and hand operating mechanism.

Figure 1ª is a side elevation of the camera and its operating mechanism.

Figure 2 is a sectional plan of Figure 1.

Figure 2ª is a sectional plan of Figure 1ª.

Figure 3 is a side sectional elevation of a construction of cabinet showing the position the apparatus will occupy.

Figure 4 is a sectional elevation of the shutter operating mechanism.

Figure 5 is a plan of Figure 4.

Figure 6 is a diagram showing the position the spoke wheels occupy just before starting the film.

Figure 7 is a similar view to Figure 6, showing the position occupied by the spoke wheels at the end of the series of photographs taken and just before the actuation of the knife for severing the film.

In carrying out this invention a cabinet 10 of convenient size has a large opening 11 at one end. In front of this opening 11, the image is placed to be photographed and enclosed by a curtain or screen 12. Behind the opening 11 and within the cabinet 10 are arranged the lens, camera and working mechanism. In the drawings the cabinet is constructed for photographing the head and shoulders of a person who stands with his arms resting on a ledge 13, but such cabinet can be arranged for taking a full length or three quarter photograph, my invention not being limited to any construction of cabinet.

On the outside of the cabinet 10 is positioned an operating handle 14, the movement of which performs a sequence of operations, namely, first, a light is switched on, secondly a camera shutter is operated, and thirdly a sensitive film is moved.

These second and third operations are repeated as many times as the mechanism has been arranged for, and when completed the fourth operation is to cut off the exposed length of sensitive film, switch off the light and actuate a numbering device.

The handle 14 is connected to a spindle 15 on which a cam or wiper 16 is mounted, and this spindle together with other mechanism is mounted in bearings of a frame 26 secured to the cabinet 10.

Three levers 17, 18, 19 are arranged to rest on and be actuated by the cam or wiper 16. Said lever 17 is pivoted near the centre at 20 and has a notch 21 at one end which engages the cam or wiper 16 and locks the apparatus against unauthorized operation. The other end of the lever 17 is provided with a pin 22 riding in a curved slot 23 of a coin chute 24 so that the weight of a coin passed into the chute 24 lowers it at that end and raises the end having the notch 21, so releasing the cam or wiper 16 and permitting its revolution, the cam or wiper 16 acting upon the adjacent end of lever 17 to lift and lower the other end to release the coin and after the cam 16 has passed the end such end will drop and reposition the lever.

At the end of the complete revolution of the cam or wiper 16 it will be engaged by the notched end of the lever 17 which locks it.

The lever 18 which is pivoted at 25 to the frame 26 has a projecting portion 27 riding on the cam 16. When the cam 16 is moved away from this portion the lever 18 is pulled down by a spring 28 connected to it and to the cabinet, and the end of the lever by means of a slot 29 engages an extension 30 of a dolly of an electric lighting switch 31.

The lever 19 which is pivoted at 20 to the frame 26 has its free end positioned on the wiper 16 when locked and such lever is connected by a Bowden wire 32 with a numbering mechanism so positioned with regard to the person being photographed that the number exhibited will be photographed on the edge of each section of a film. In the drawings it is shown under the ledge 13.

As the wiper 16 is revolved, the lever 19 will fall on to a stop 33 and on the completion of the revolution of the wiper 16 it will act upon the lever 19 and lift it and in so doing the Bowden wire will be acted upon and revolve the counter one unit and so expose the succeeding number for the next sitter.

The spindle 15 to which the handle 14 is connected carries a bevel wheel 34 meshing with a bevel wheel 35 and shaft 36 mounted in suitable bearings 37, 37 such shaft carrying a spoked wheel 38 which in turn actuates a second spoked wheel 39 attached to a vertically arranged film sprocket wheel 40, so that the two spoked wheels 38, 39 have no outer rims. The spokes 38ª, 39ª act as teeth and they are not in constant mesh.

In the drawings, I have shown the spoked wheels 38, 39 as for exposing eight sections of the film in one rotation and such spokes are arranged at equal distances apart except for a treble space between two spokes on the wheel 38. In other words I form ten holes around the circumference of the disc or wheel 38 and fit thereto eight spokes leaving two holes next to each other, and such spokes are are at a distance from one another to coincide with the width of each segment of the film to be exposed.

A camera shutter, through a lever 41, is pivoted at 42 to a base 43 carrying the camera and such lever 41 is operated by the first spoked wheel 38 during the intervals of disengagement with the second spoked wheel 39.

This lever 41 is provided with a curved free end 41ª against which the spokes 38ª have a wiping action and such lever is provided with a slot 44 in which one end 43 of a bell crank lever 46 pivoted at 47 to the camera is positioned, the other end 48 of the bell crank lever pivotally connected to a curved arm 49 pivotally connected to a crank 50 of the shutter mechanism to actuate same, the shutter mechanism in this case being of the well known Iris type.

On the first spoked wheel 38 is arranged a wiper 51 which engages one end of an angled lever 52 pivoted at 53 to a bracket 54 carried by the base 43 the other end of the angled lever 52 carrying a knife blade 55 positioned to have a movement across the end of the back guiding plate 57, and within a hollow oblong frame 58 positioned next to the exposure hole 59 of a plate 60 which forms the back of the camera, the space between the two plates 57, 60 forming a guideway for the film which is taken from a spool positioned as desired, the film passing into the entrance tube 61 of the cover 62 against the sprocket 40 where the sprocket pins engage the holes in the edges of the film and pass it along the guideway between the plates 57, 60 to the exposure opening.

On the cabinet 10 and surrounding the spindle 15 of the handle 14 is an annular row of holes 63 corresponding in position to the handle and in the handle is a spring controlled plunger 64 which engages each hole 63 in succession, the holes determining the actual positioning of the handle after each action of the spoked wheels and shutter giving time for the sitter to change position. These holes correspond with the spokes of the wheel.

The lens 65 is of the usual character and positioned within the camera body 66 which is preferably provided with a flared front 67 positioned under and behind the electric lighting medium 68 which obtains its current from any supply.

69 is a dark room at the rear of the cabinet 10 which is provided with a shelf 70 on which the film can be developed and fixed in the ordinary manner.

The camera body 68 is located under a cover 62 which can be removed for attention to the camera or lens.

The action is as follows, (the film having been positioned and covered by the shutter) the handle 14 being at zero as in Figure 1.

A person wishing his photograph to be taken, places a shilling or other coin representing the charge, in the chute 24 and its dropping on the pin 22 overbalances the lever 17 and causes its notched end 21 to be lifted just clear of the wiper 16, the coin being retained in the chute by reason of its narrowness at that part, the pin 22 preventing it falling.

The handle is now operated and in so doing the wiper 16 will act upon the nose portion 21ª of the notched end 21 of the lever 17 and will lift that end of the lever further and in consequence the other end of the lever will be lowered and allow the coin to reach a wider part of the chute and fall off the pin 22.

After the wiper has passed the nose 21ª the lever 17 will reoccupy its ordinary position.

During this movement the wiper 16 has left the projection 27 of the lever 18 which has been pulled down by the spring 28 and the electric switch 31 operated and lamp 68 accordingly illuminated and also during this movement the wiper 16 has receded from the lever 19 and allowed it to drop.

During this movement and the continued movement the shaft 15 has revolved the shaft 36 and the spoked wheel 38 and this wheel 38 is positioned so that the first spoke of the series acts upon the lever 41 and this through its connecting mechanism, operates the shutter to expose the portion of the film behind it and on leaving the lever the shutter will be returned by its spring. Immediately following this, the first spoke of wheel 36 will act against a spoke of the wheel 39 and the film will be moved to position a fresh section behind the opening 59.

At the end of these operations the handle is arrested by its spring controlled plunger 64 entering the first hole 63.

At this stage the attendant who operates the handle can inform the sitter that his position can be changed.

On a further actuation of the handle the same events take place until the eight segments of the film are exposed, the shutter closed, and the film moved on. The sprocket wheel 38 has now reached a position where the treble space will miss the shutter lever and the spokes of the wheel 39, so no action thereon can take place during the next movement of the handle, during which the wiper 51 will actuate the lever 52 and knife 55 and cut off the exposed portion of the film, this portion then being removed, developed and fixed in the dark room 69.

During the rotation of the spindle 15 by the handle 14 the wiper 16 has been carried round doing no work, but after the film has been cut the wiper will have reached a position to operate the levers 17, 18, 19 which it does by lifting each lever to its original position, the lever 17 occupying its proper position with regard to the coin chute and the wiper, the lever 18 operating the switch 31 to cut off the light and the lever 19 acting upon the Bowden wire which in turn acts upon the counting mechanism to expose a fresh unit.

At the end of these operations the handle 14 is in the zero position ready for a repeat of the operations.

What I do claim as my invention and desire to obtain by Letters Patent is:—

1. In photographic apparatus, a frame, an operating spindle journaled thereon, a cam on said spindle, mechanism for locking the cam, a lighting means, a lever operable by the cam to control said lighting means, a wheel provided with spokes, gearing connecting the spindle and spoked wheel, a film camera having a lens and a shutter controlling the same, mechanism actuated by the spoked wheel to operate said shutter, a film-moving member actuated by the spoked wheel, a second spoked wheel on said member, a knife, mechanism operable by the first spoked wheel to actuate said knife for severing the film after the required number of photographs have been taken, the spokes of each wheel being free at their outer ends and disposed at equal distances apart aside from two on the first spoked wheel, said two spokes being farther apart than the remaining pairs of spokes.

2. In photographic apparatus according to claim 1, a second lever, said second lever having an overbalanced end provided with a notch engaging said cam and having the other end positioned for coin-actuation, an electric switch operated by the first lever, and said lighting means including a lamp in an electric circuit controlled by said switch.

3. In photographic apparatus according to claim 1, a shaft geared to said spindle and carrying said first spoked wheel, a bell crank lever engageable by the spokes on the first spoked wheel, a bar connected to said bell crank lever, shutter operating mechanism to which the bar is also connected to control the aforesaid lens, a projection on the first spoked wheel, an angled lever acted upon at one end by said projection, the other end of said angled lever serving to actuate the aforesaid knife.

In testimony whereof I have hereunto set my hand.

GEORGE HENRY HANA.